(12) United States Patent
Chan et al.

(10) Patent No.: US 9,503,404 B2
(45) Date of Patent: Nov. 22, 2016

(54) CORRECTION OF INCOMING MESSAGING

(71) Applicant: International Business Machines Corporation, Armonk, NY (US)

(72) Inventors: Yuk L. Chan, Poughkeepsie, NY (US); Christopher Cramer, Troy, NY (US); Robert G. King, Longmont, CO (US); Deepti M. Naphade, Fishkill, NY (US); Jairo A. Pava, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/059,626

(22) Filed: Mar. 3, 2016

(65) Prior Publication Data
US 2016/0173426 A1 Jun. 16, 2016

Related U.S. Application Data

(63) Continuation of application No. 14/056,187, filed on Oct. 17, 2013.

(51) Int. Cl.
*H04L 12/58* (2006.01)
*H04W 4/14* (2009.01)
*G06F 17/27* (2006.01)
*G06F 3/023* (2006.01)
*G06F 3/0484* (2013.01)
*G06F 17/24* (2006.01)

(52) U.S. Cl.
CPC ........... *H04L 51/046* (2013.01); *G06F 3/0233* (2013.01); *G06F 3/04842* (2013.01); *G06F 17/24* (2013.01); *G06F 17/273* (2013.01); *G06F 17/2735* (2013.01); *H04L 51/063* (2013.01); *H04W 4/14* (2013.01)

(58) Field of Classification Search
CPC .. G06F 3/0237; G06F 17/276; G06F 3/0418; G06F 17/3064; G06F 17/2735; G06F 3/0233
See application file for complete search history.

(56) References Cited

U.S. PATENT DOCUMENTS

| | | | |
|---|---|---|---|
| 7,543,033 B2 | 6/2009 | Vincent | |
| 2014/0040773 A1* | 2/2014 | Sanghavi | G06F 17/273 715/753 |
| 2015/0067486 A1 | 3/2015 | Hochman et al. | |

* cited by examiner

*Primary Examiner* — Chirag R Patel
(74) *Attorney, Agent, or Firm* — Cantor Colburn LLP; William A. Kinnaman, Jr.

(57) ABSTRACT

Embodiments of the disclosure relate to performing correction on incoming messages. Embodiments include receiving a message from a sender and determining if a portion of the message has been auto-corrected by the sender. Embodiments also include performing a correction on the portion of the message that was auto-corrected by the sender and storing the correction made by the receiver for each individual sender.

1 Claim, 12 Drawing Sheets

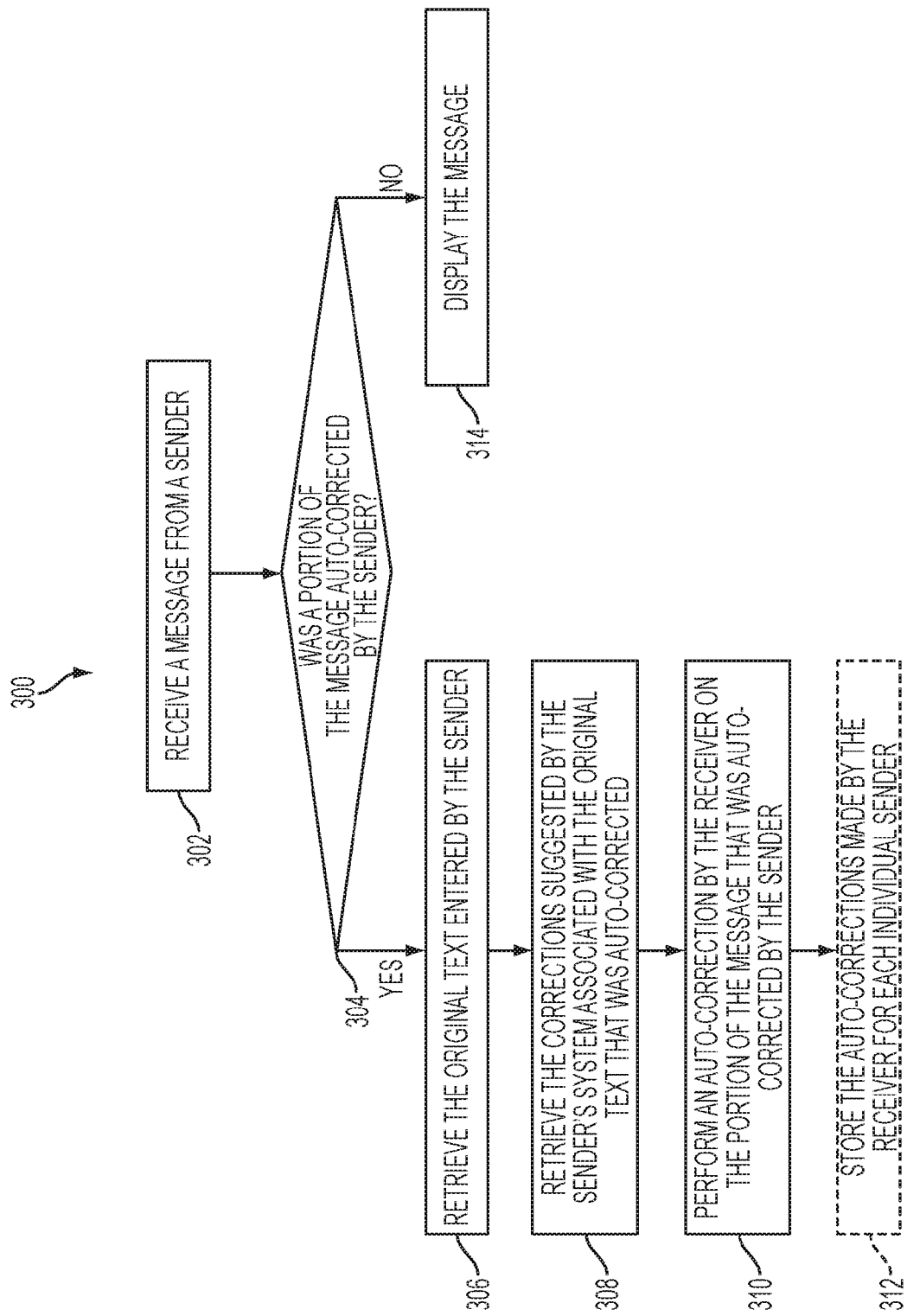

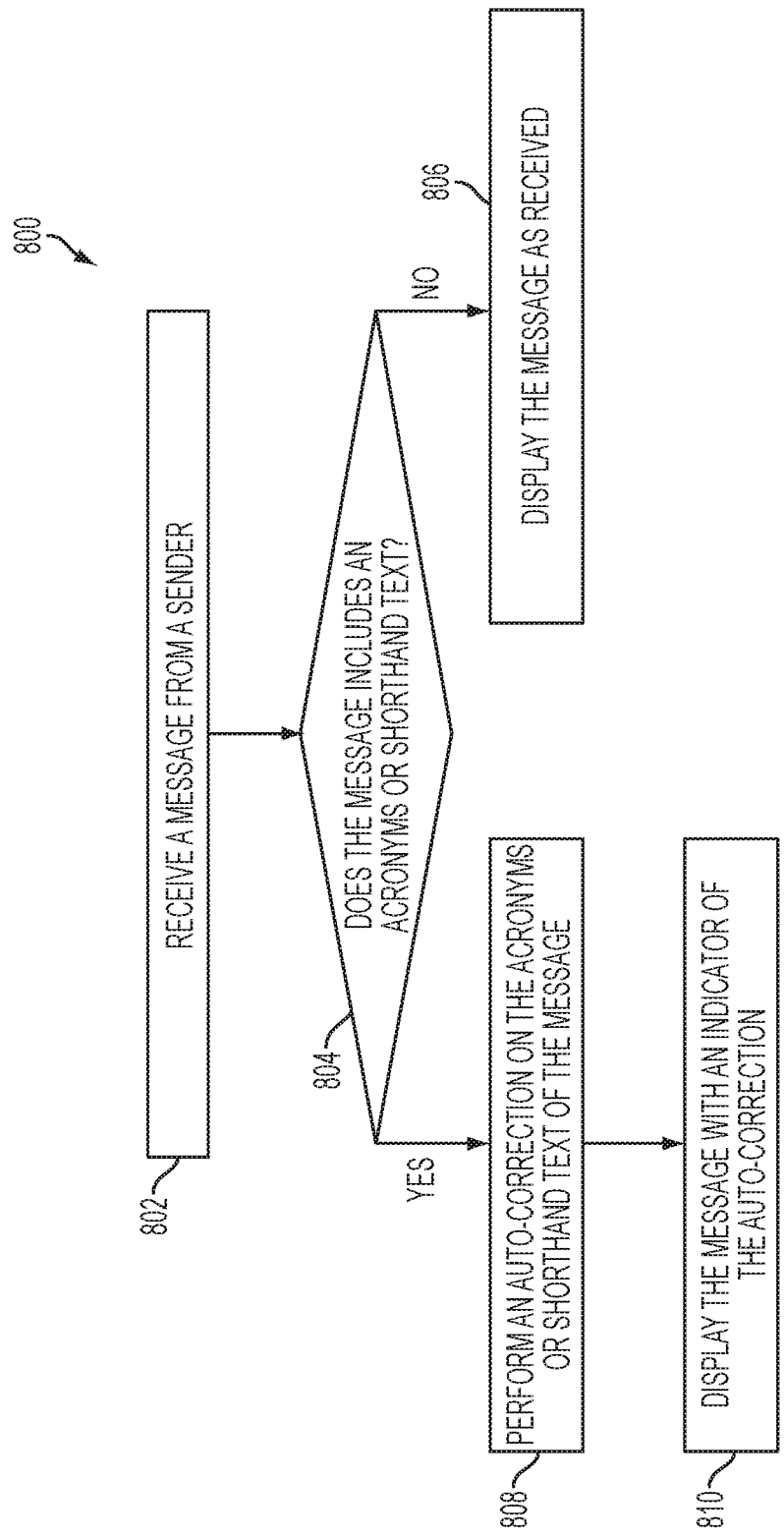

CORRECTION OF INCOMING MESSAGING

DOMESTIC PRIORITY

This application is a continuation of the legally related U.S. application Ser. No. 14/056,187 filed Oct. 17, 2013, which is fully incorporated herein by reference.

BACKGROUND

The present disclosure relates to correction in messaging applications, and more specifically, to correction of incoming messages by a messaging application.

Electronic communications environments have become widely used. In particular, instantaneous electronic communication has become prevalent in today society. Some examples of instantaneous electronic communication methods are instant messaging and short messaging service (SMS), commonly referred to as texting. These messaging environments are used in traditional computing devices and are also commonly used on mobile devices, which typically include smaller keyboards that are prone to typographical errors.

A variety of different technologies have been developed to attempt to automatically correct typing errors that are made using the small keyboards of mobile devices. In general, auto-correction technologies use a combination of algorithms and natural patterns, such as using parts of speech tagging and named entity recognition for spelling correction, statistical language models for contextual lookup, and combining timing and geometry for typing correction. These auto correction technologies are typically utilized on the device used by the sender of a message.

In mobile phone messaging in particular, messages are often typed and sent without being reviewed by the sender. Accordingly, incorrect words (either typed wrong or auto-corrected incorrectly) are regularly sent to the receiver. These kinds of errors are often repeated over and over again, because these types of typing errors are highly correlated with the sender's typing style.

Currently, no correction technology has been sufficiently able to fix all of the errors that are created by the users.

SUMMARY

According to one embodiment, a method for performing correction on incoming messages including receiving, by a processor, a message from a sender. The method also includes determining if a portion of the message has been auto-corrected by the sender and performing a correction on the portion of the message that was auto-corrected by the sender. The method further includes storing the correction made by the receiver for each individual sender.

According to another embodiment, a computer program product for performing auto-correction on incoming messages, the computer program product including a tangible storage medium readable by a processing circuit and storing instructions for execution by the processing circuit for performing a method that includes receiving a message from a sender. The method also includes determining if a portion of the message has been auto-corrected by the sender and performing an auto-correction on the portion of the message that was auto-corrected by the sender. The method further includes storing the auto-correction made by the receiver for each individual sender.

According to another embodiment, a method for transmitting messages including auto correction data includes receiving a message from a user and performing, by a processor, an auto-correction on a portion of the message. The method also includes transmitting the message including an indication of the auto-correction to a receiver.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3A is a flow diagram of a method for performing correction on incoming messages in accordance with an exemplary embodiment.

FIG. 6 is a flow diagram of a method for performing correction on incoming messages in accordance with an exemplary embodiment.

DETAILED DESCRIPTION

Exemplary embodiments of the disclosure include methods, systems and computer program products having a messaging application that performs automatic correction by the receiver of a message. In exemplary embodiments, messaging software on a receiver's device is configured to perform subsequent auto-correction on a portion of an incoming message based on determining that the portion was auto-corrected by the sender. In exemplary embodiments, the messaging software on a receiver's device is configured automatically correct a portion of an incoming message based on determining that the portion of the message matches a conversion stored on the receiver's device.

Figure 1:
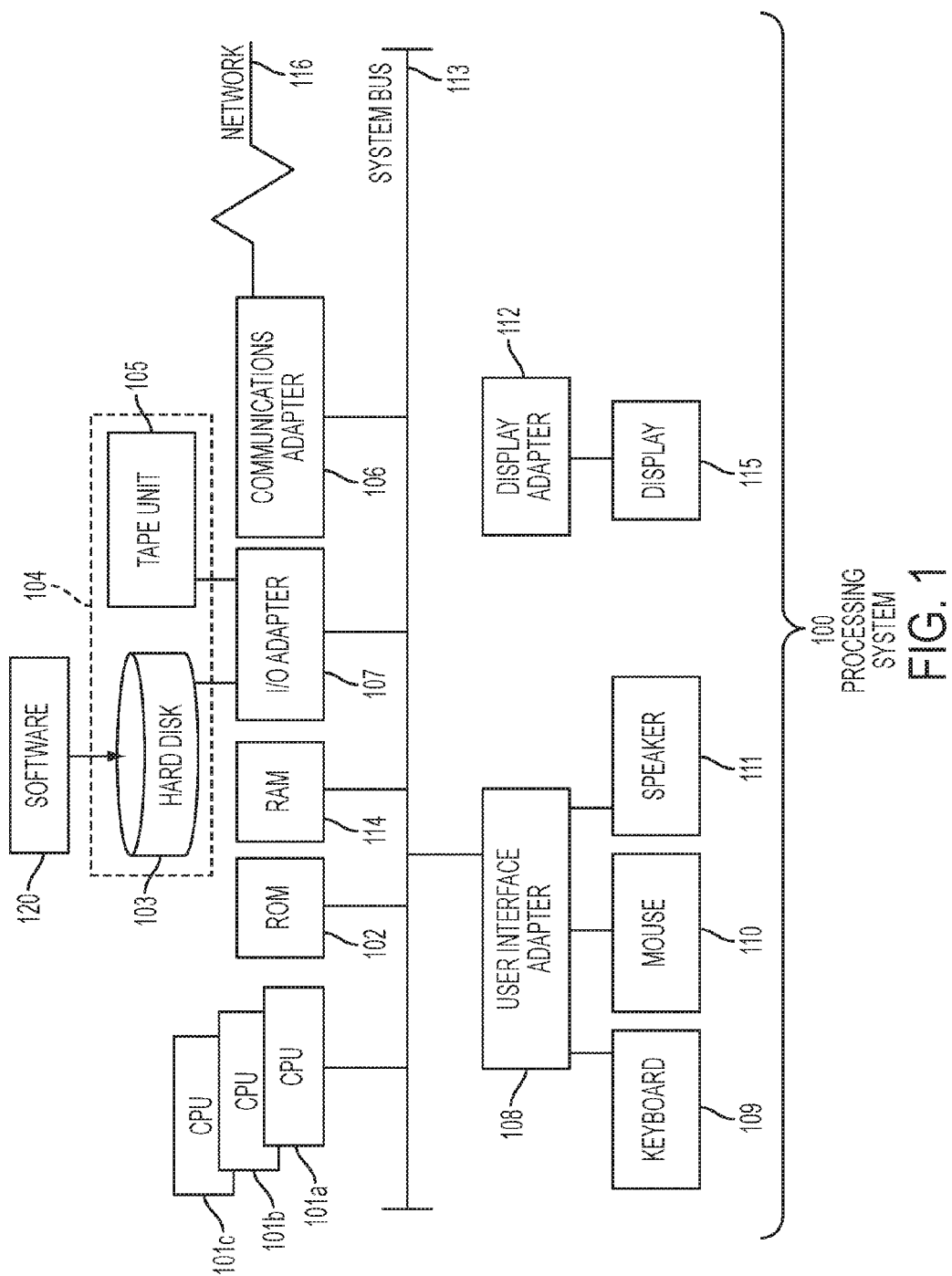
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
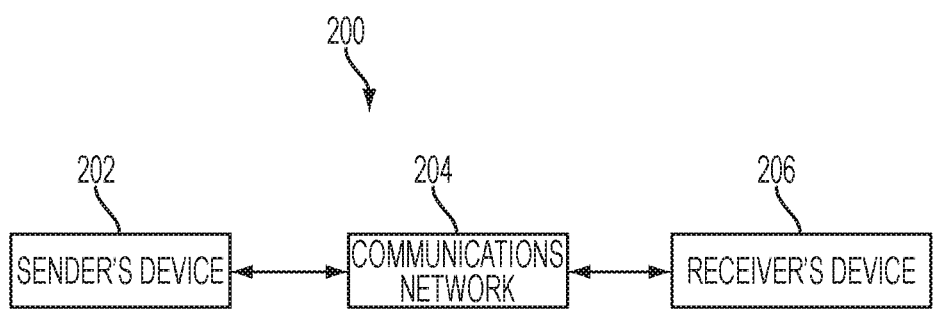
FIG. 2 is a block diagram illustrating a communication system in accordance with an exemplary embodiment.

Referring now to FIG. 2, a block diagram of a communications system 200 is shown. As illustrated, the communications system 200 includes a sender's device 202, a receiver's device 204 and a communications network 204. In exemplary embodiments, the sender's device 202 and the receiver's device 204 are configured to communicate over the communications network 204. In exemplary embodiments, the sender's device 202 and receiver's device 204 may be a processing system as shown in FIG. 1, a smartphone, a tablet, or any other suitable device. In exemplary embodiments, the communications network 204 may include a cellular phone network, a local area network, a wide area network, the Internet, or the like.

Referring now to FIG. 3A, a flow chart illustrating a method 300 for performing correction on incoming messages in accordance with an exemplary embodiment is shown. In exemplary embodiments, the correction on the incoming messages may be an auto-correction or a manual correction. As shown at block 302, the method 300 includes receiving a message from a sender. Next, as shown at decision block 304, the method 300 includes determining if a word in the message has been auto-corrected by the sender. If a word in the message has been auto-corrected by the sender, the method 300 includes retrieving the original text entered by the sender, as shown at block 306. Next, as shown at block 308, the method 300 includes retrieving the corrections suggested by the sender's system associated with the original text that was auto-corrected.

In exemplary embodiments, the message transmitted by the sender may include metadata that includes the original text of the message as typed by the sender, an auto-correction that was selected by the sender and any auto-corrections suggestions that were presented to and not selected by the sender. In exemplary embodiments, the receiver may transmit a separate message to the sender to request the original text entered by the sender upon determining that a word in the message was auto-corrected by the sender. In addition, the message may request any auto-corrections suggestions that were presented to and not selected by the sender.

Continuing with reference to FIG. 3A, as shown at block 310, the method 300 includes performing an auto-correction by the receiver on the portion of the message that was auto-corrected by the sender. In exemplary embodiments, performing the subsequent auto-correction may include allowing the receiver to view and select from the auto-correction suggestions that were presented to and not selected by the sender. In exemplary embodiments, performing the subsequent auto-correction may also include allowing the receiver to enter an alternative other than those presented to or selected by the sender. As shown at block 312, the method 300 may also include storing the auto-corrections made by the receiver for each individual sender. In exemplary embodiments, the subsequent auto-correction may be performed automatically based on the stored history of auto-corrections made by the receiver for the sender. In exemplary embodiments, the receiver is configured to be able to view and search both the auto-corrected message and original message. As illustrated at block 314, the method 300 includes displaying the message as received by the sender if it is determined that a word in the message has not been auto-corrected by the sender.

Figure 3B:
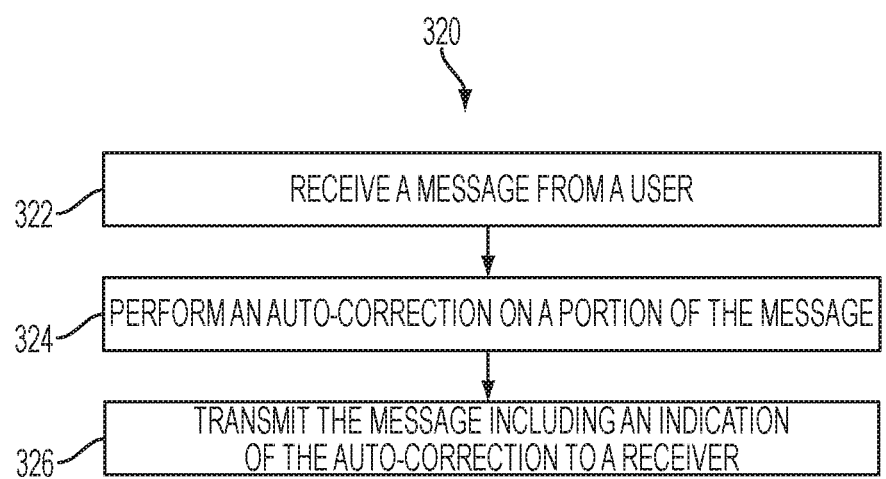
FIG. 3B is a flow diagram of a method for transmitting messages including auto-correction data in accordance with an exemplary embodiment.

Referring now to FIG. 3B a flow chart illustrating a method 320 for transmitting messages including auto correction data in accordance with an exemplary embodiment is shown. As shown at block 322, the method 320 includes receiving a message from a user. Next, as shown at block 324, the method 320 includes performing an auto-correction on a portion of the message. In exemplary embodiments, the auto-correction may be performed through a regular dictionary or any other mechanisms. The method 320 also includes transmitting the message including an indication of the auto-correction to a receiver, as shown at block 326. In exemplary embodiments, the message transmitted by the sender includes metadata that indicating the original text of the message as typed by the sender, an auto-correction that was made and any auto-corrections suggestions that were presented to and not selected by the sender.

Figure 4A:
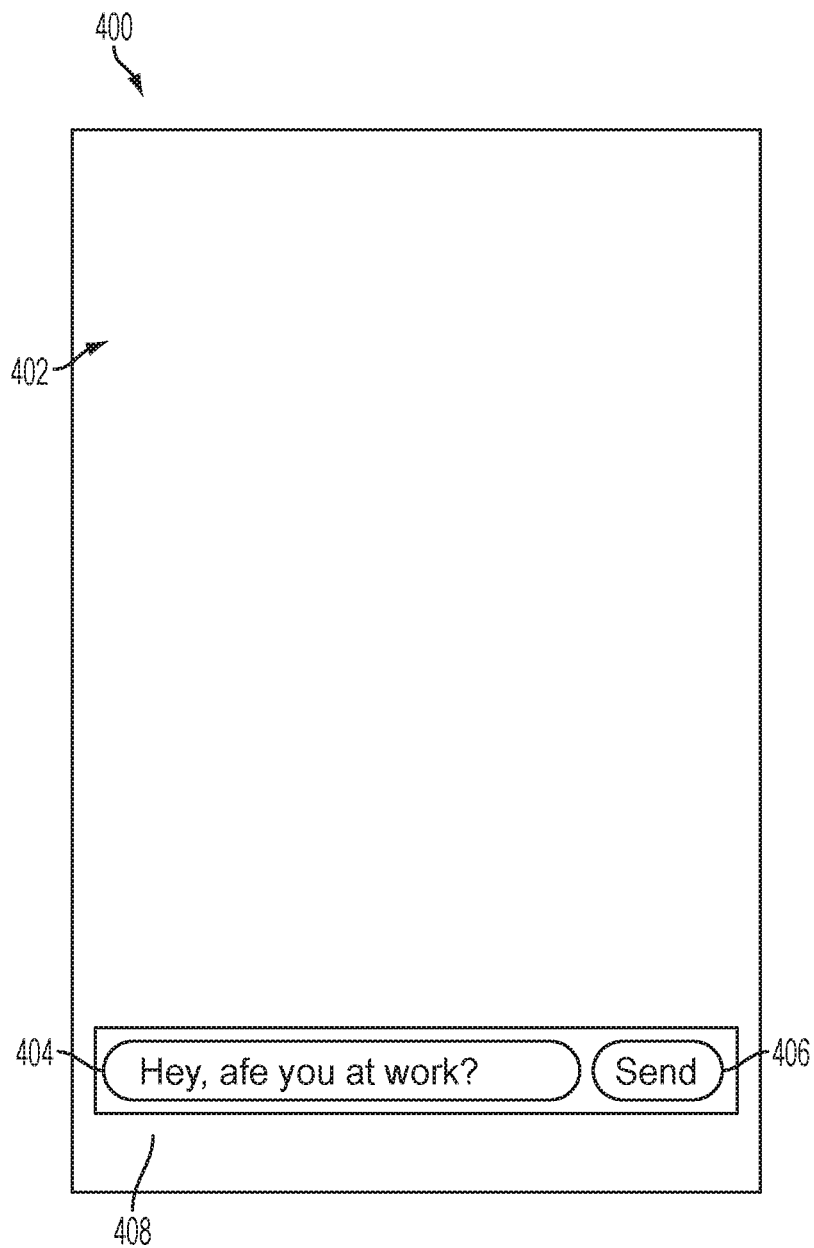
FIG. 4A is an illustration of a messaging application utilizing recipient correction being used by a first user in accordance with an exemplary embodiment.
Figure 4B:
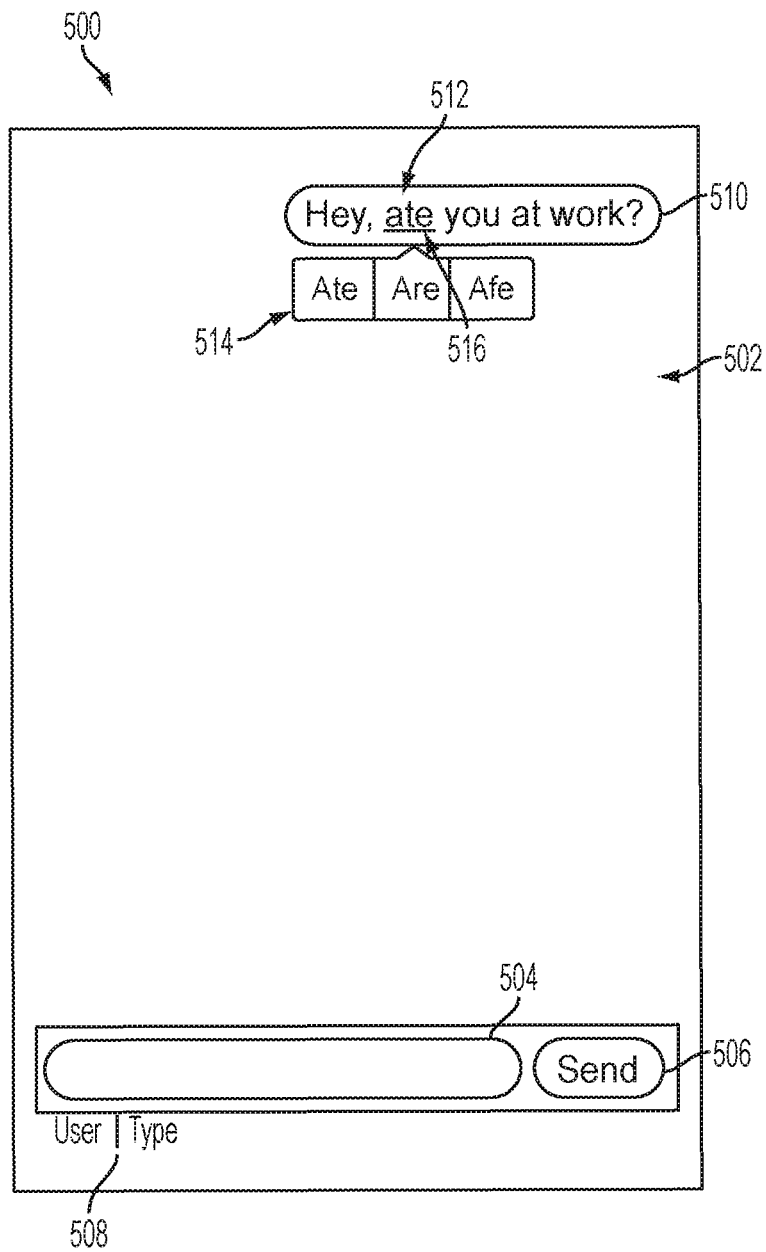
FIG. 4B is an illustration of a messaging application utilizing recipient correction being used by a second user in accordance with an exemplary embodiment.
Figure 4C:
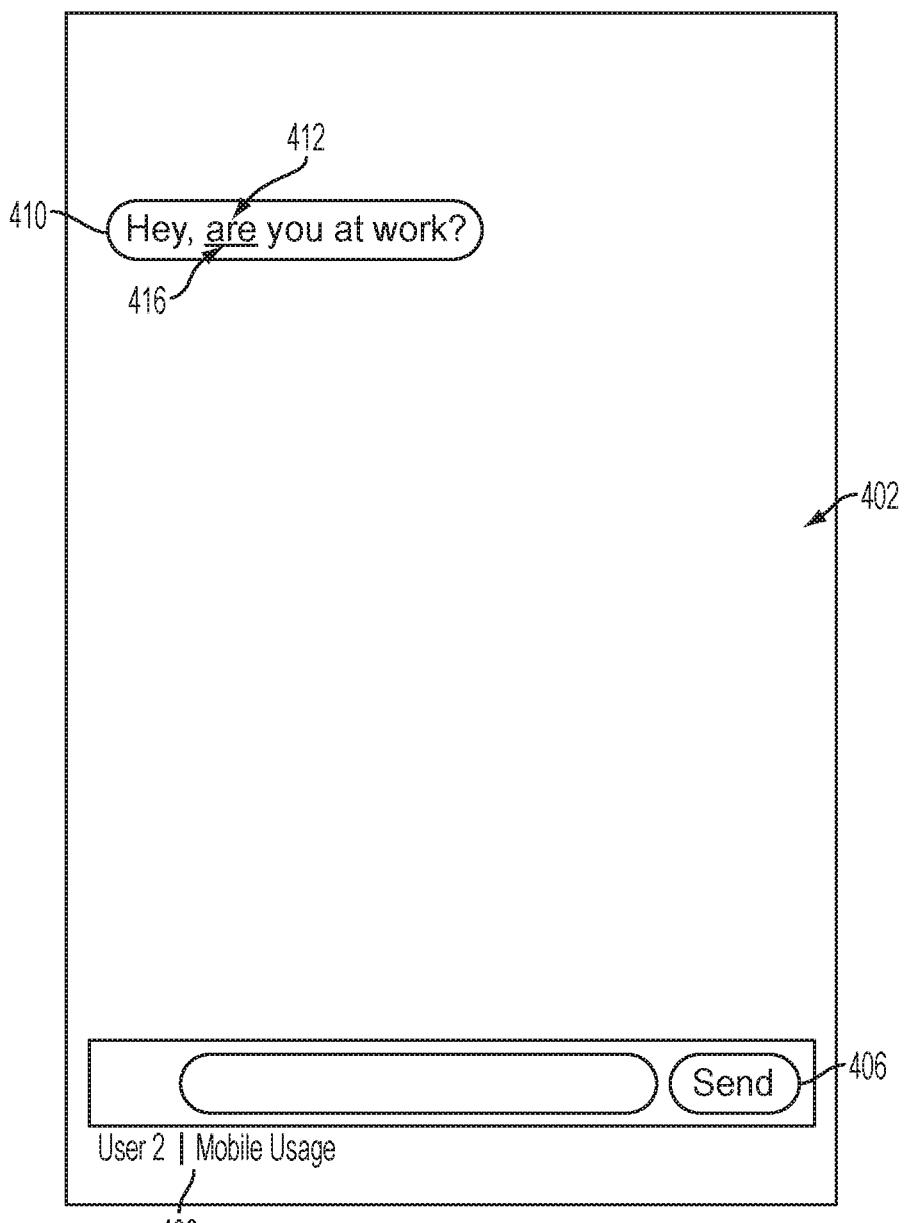
FIG. 4C is an illustration of a messaging application utilizing recipient correction being used by a first user in accordance with an exemplary embodiment.
Figure 4D:
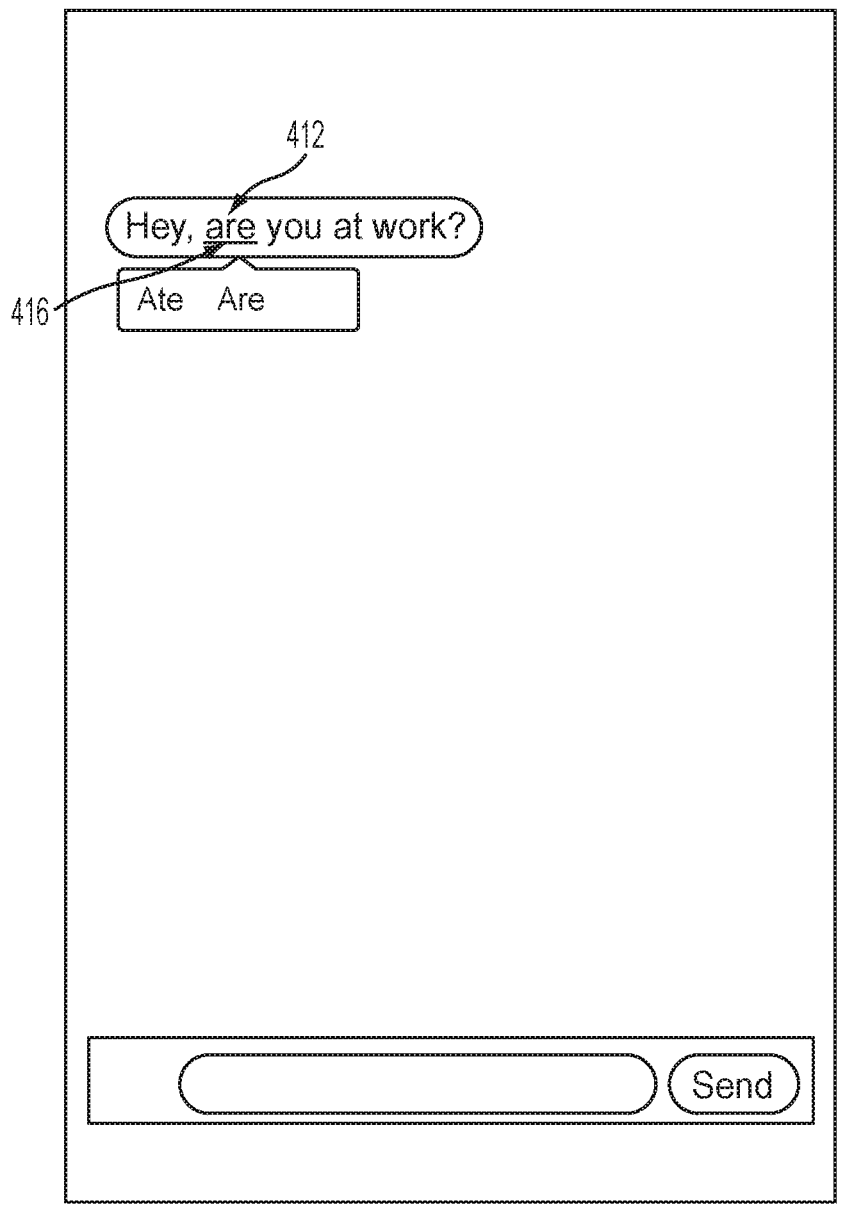
FIG. 4D is an illustration of a messaging application utilizing recipient correction being used by a second user in accordance with an exemplary embodiment.

Referring now to FIGS. 4A through 4D, exemplary embodiments of a messaging application utilizing receiver correction being used are shown. FIGS. 4A and 4C illustrate a messaging application 400 that is being used by a first user and FIGS. 4B and 4D illustrates a messaging application 500 that is being used by a second user. As illustrated, the messaging application 400 includes a transcript window 402, a message composition window 404, a send button 406, and a status indicator 408. Likewise, the messaging application 500 includes a transcript window 502, a message composition window 504, a send button 506, and a status indicator 508. In exemplary embodiments, the transcript windows 402, 502 include messages that have been exchanged between the first and second users and an indication of the author or sender of each message. In exemplary embodiments, the status indicators 408, 508 are configured to provide one user with an indication of an action being taken by the other user. For example, the status indicators 408, 508 indicate that the second user is making a modification to the message 510.

In one embodiment, a first user uses the messaging application 400 to draft and send a message to the messaging application 500 of a second user. As illustrated in FIG. 4A, a first user incorrectly types the message "Hey, afe you at work?" in the message composition window 404. The first user and transmits the message by pressing the send button 406 without noticing that the auto-correction software of the first user's device has improperly the replaced the word "afe" with "ate". Next, as illustrated in FIG. 4B, a portion 512 of the message 510 that was auto-corrected by the sender is indicted by an indicator 516. In exemplary embodiments, the indicator 516 may be an underling, italicizing, bolding, coloring or shading of the portion 512 of the message 510. In exemplary embodiments, the second user can select the portion 512 of the message 510 for subsequent correction by clicking on the portion 512. After clicking on the portion 512, an icon 514 may be displayed in the transcript window 502. The icon 514 may include the actual text input by the sender and one or more auto-corrections suggestions that were presented to and not selected by the sender. In exemplary embodiments, the actual text input by the sender may be displayed in a different color that the one or more auto-corrections suggestions that were presented to and not selected by the sender.

As illustrated in FIG. 4C, the message 410 displayed in the transcript window 402 of the messaging application 400 has been updated to reflect the change made by the receiver. In exemplary embodiments, the sender is notified of the change through an indicator 416 on the changed portion 412 of the message 410. In exemplary embodiments, the indicator 416 may be an underling, italicizing, bolding, coloring or shading of the portion 412 of the message 410 that was modified by the receiver. As shown in FIG. 4D, by clicking on the portion 412, an icon 414 may be displayed in the transcript window 402. The icon 414 is configured to allow the sender to override or confirm the change made by the sender. In exemplary embodiments, the icon 414 may display the actual text input by the sender and one or more auto-corrections suggestions that were originally presented to and not selected by the sender. In exemplary embodiments, the actual text input by the sender may be displayed in a different color that the one or more auto-corrections suggestions that were presented to and not selected by the sender.

In exemplary embodiments, the messaging software on a receiver's device may be configured to automatically correct one or more words in an incoming message based on determining that a word in the message matches a pre-configured conversion. In exemplary embodiments, the messaging software used by the sender's device and the receiver's device are configured to keep track of words that have been auto-corrected by the other party's messaging software. In exemplary embodiments, the messaging software is configured to use a software data structure, such as a map, that matches user-defined text conversions. For example, a user might define a conversion of the word "colour" to "color" such that any incoming messages that contain the word "colour" are automatically converted to "color." In exemplary embodiments, the messaging software may include one or more default data structures having conversions that are pre-defined. Some examples could be conversions from British to American word spellings, text message short hand (i.e., LOL) to proper English spelling, and many others.

Figure 5A:
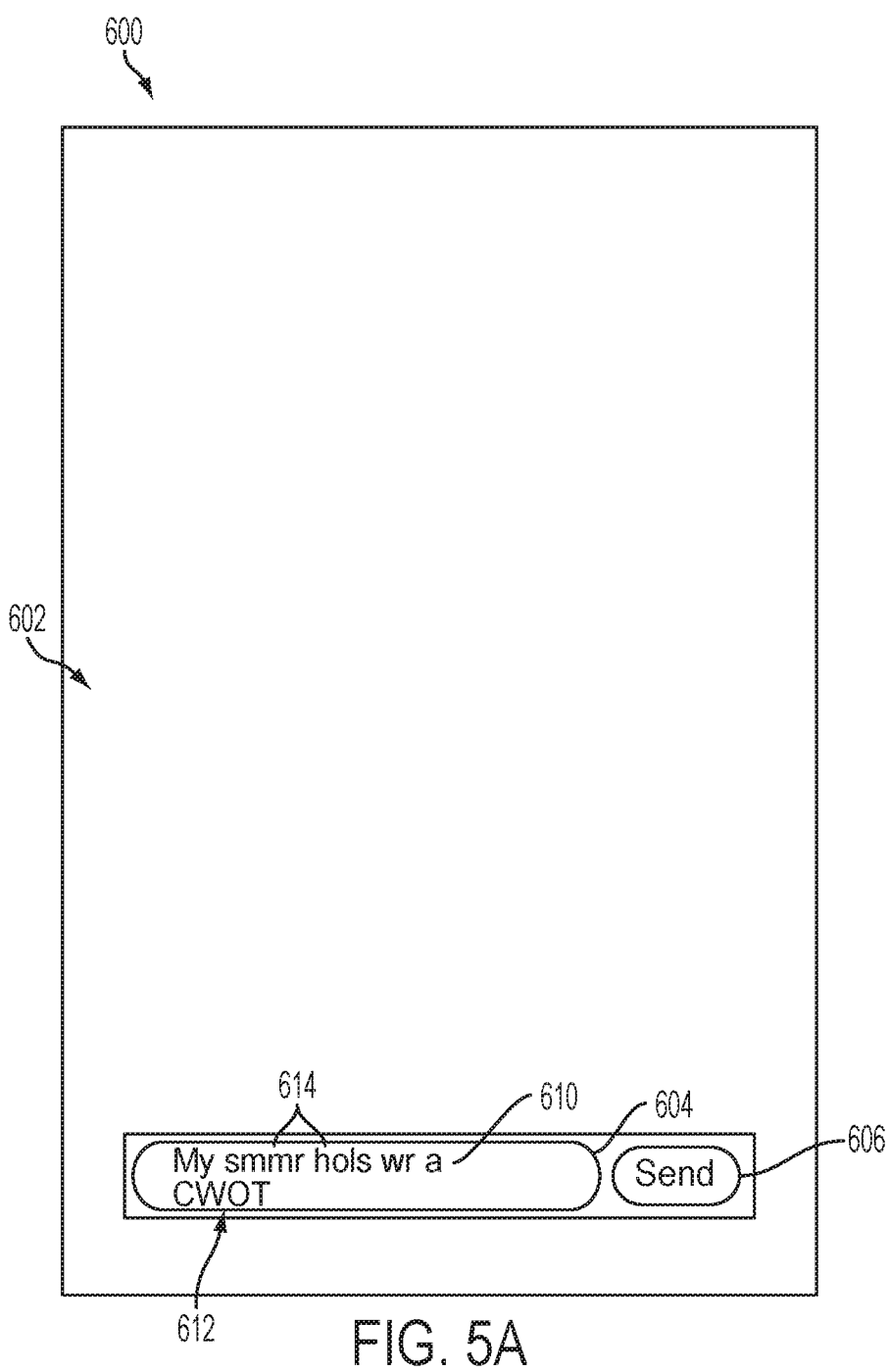
FIG. 5A is an illustration of a messaging application utilizing recipient correction being used by a first user in accordance with an exemplary embodiment.
Figure 5B:
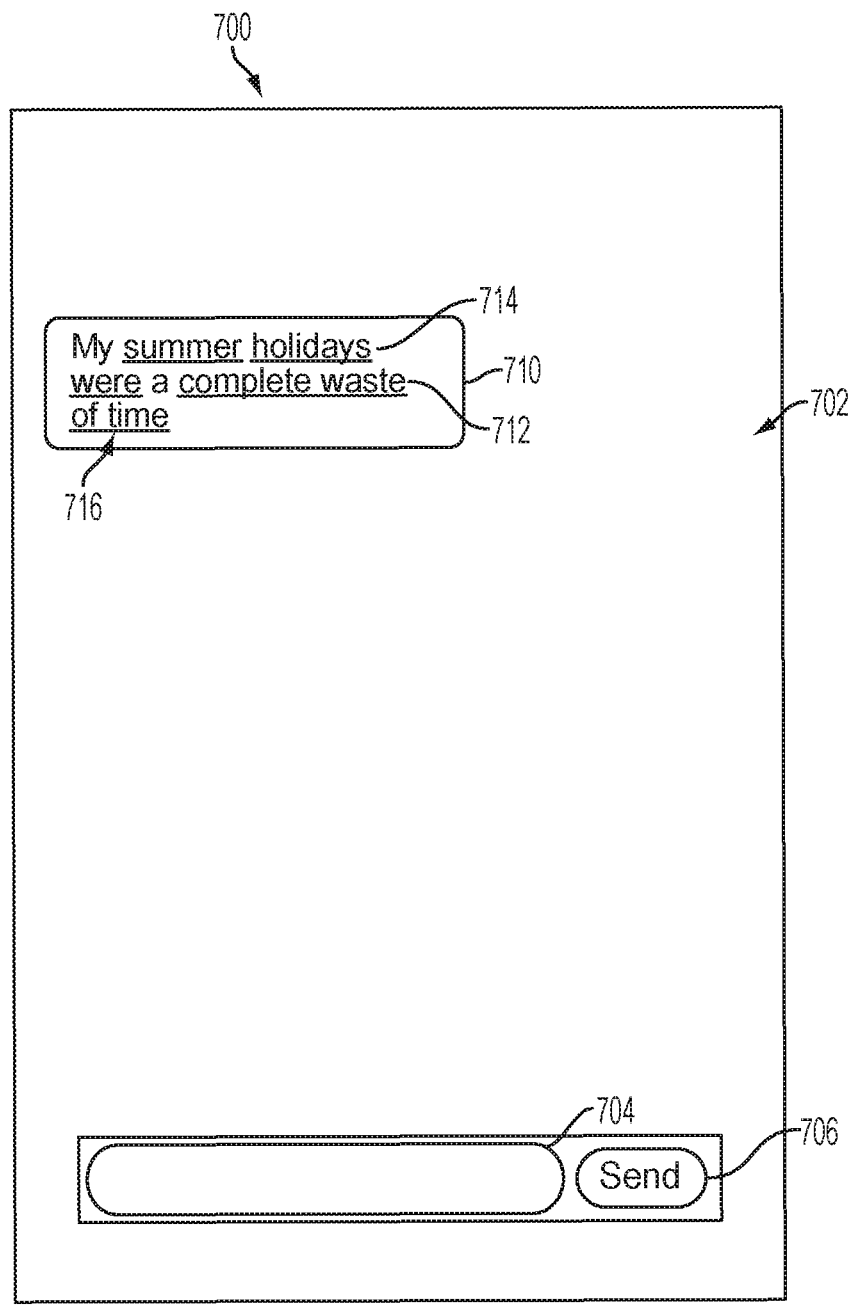
FIG. 5B is an illustration of a messaging application utilizing recipient correction being used by a second user in accordance with an exemplary embodiment.
Figure 5C:
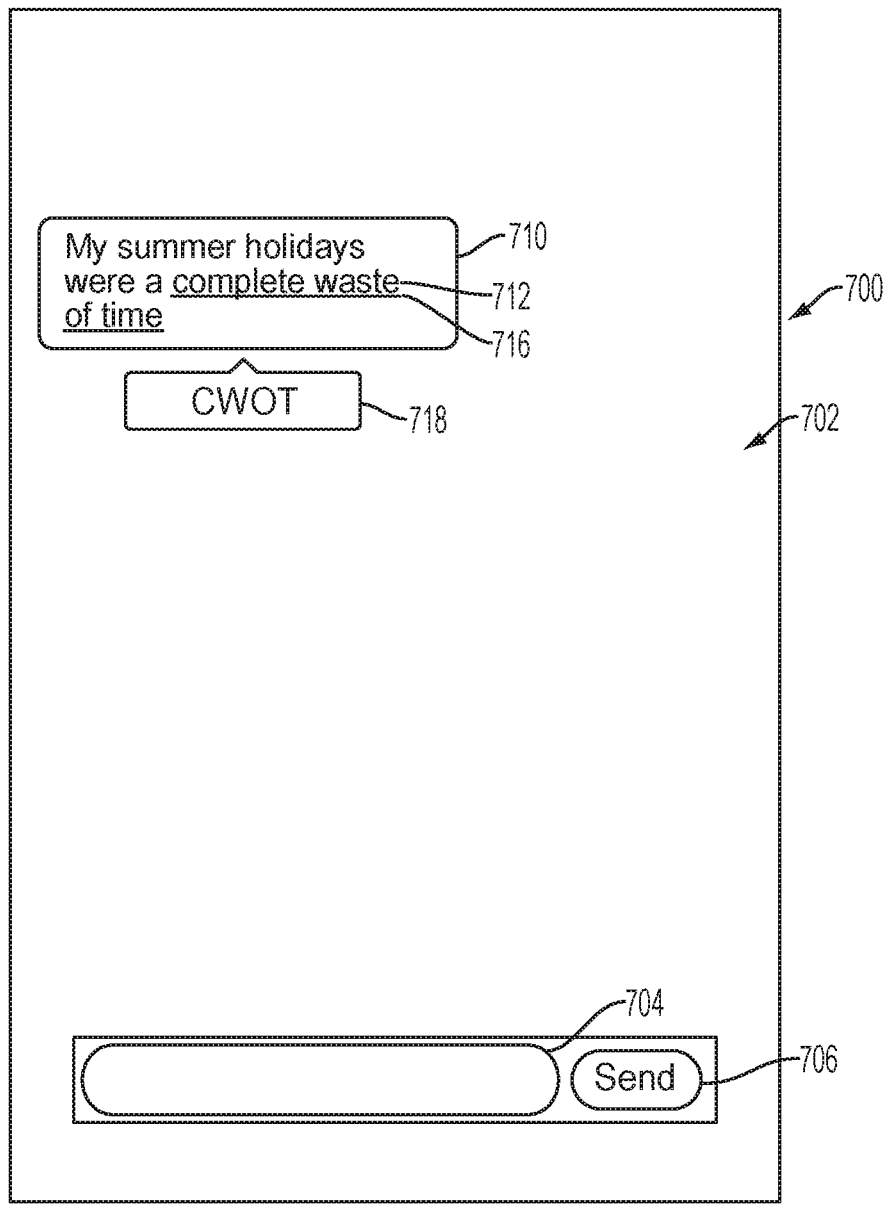
FIG. 5C is an illustration of a messaging application utilizing recipient correction being used by a second user in accordance with an exemplary embodiment.

Referring now to FIGS. 5A through 5C, exemplary embodiments of a messaging application utilizing receiver correction being used are shown. FIG. 5A illustrates a messaging application 600 that is being used by a first user and FIGS. 5B and 5C illustrates a messaging application 700 that is being used by a second user. As illustrated, the messaging application 600 includes a transcript window 602, a message composition window 604, and a send button 606. Likewise, the messaging application 700 includes a transcript window 702, a message composition window 704, and a send button 706. In exemplary embodiments, the transcript windows 702, 702 include messages that have been exchanged between the first and second users and an indication of the author or sender of each message.

As illustrated in FIG. 5A, a first user drafts a message 610 to a second user using the message composition window 602. In exemplary embodiments, the message 610 may include full text words, acronyms 612 and abbreviated and/or shorthand text 614. In many cases, the receiver of a message 610 having acronyms 612 and abbreviated or shorthand text 614 may not clearly understand the meaning of the acronyms 612 and abbreviated or shorthand text 614.

As illustrated in FIG. 5B, the second user receives the message 710 from the first user and the auto-correction software on the receiver's device recognizes the shorthand text from previous conversations and automatically modifies the message 710 to replace the shorthand text and acronyms with full text words so that the receiver can better understand the message. In exemplary embodiments, the receiver is notified of the change through an indicator 716 on the changed portion 712, 714 of the message 710. In exemplary embodiments, the indicator 716 may be an underling, italicizing, bolding, coloring or shading of the portion 712 of the message 710 that was modified. As shown in FIG. 5C, by clicking on the portion 712, an icon 718 may be displayed in the transcript window 702. The icon 718 is configured to display the original text that was typed by the sender and optionally to allow the receiver to confirm or override the modification that was made.

Referring now to FIG. 6 a flow chart illustrating a method 800 for performing correction on incoming messages in accordance with an exemplary embodiment is shown. As shown at block 802, the method 800 includes receiving a message from a sender. Next, as shown at decision block 804, the method 800 includes determining if the message includes an acronyms or shorthand text. If the message includes an acronyms or shorthand text, the method 800 proceeds to block 808 and performs an auto-correction on the acronyms or shorthand text of the message. In exemplary embodiments, performing the auto-correction on the acronyms or shorthand text of the message includes replacing the acronyms or shorthand text with full text words based on a conversion map. If the message does not include an acronyms or shorthand text, the method 800 proceeds to block 806 and displays the message as received. As shown at block 810, the method 800 also includes displaying the message with an indicator of the auto-correction. In exemplary embodiments, the indicator may be an underling, italicizing, bolding, coloring or shading of the portion of the message that was modified.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for performing correction on incoming messages comprising:

receiving, by a processor of a receiving device, a message from a sender wherein the message is composed by the sender using a sending device that is separate from the receiving device and wherein the message includes an original text of the message as typed by the sender, an auto-correction that was selected by the sender and an auto-correction suggestion that was presented to and not selected by the sender;

determining if a portion of the message has been auto-corrected by the sending device prior to transmission of the message by the sending device;

based on determining that the portion of the message has been auto-corrected prior to transmission of the message by the sending device, performing a correction, by the receiving device, on the portion of the message that was auto-corrected by the sender by displaying the auto-correction suggestions retrieved from the sender;

displaying, on the receiving device, the message with an indicator of the auto-correction performed by the sending device;

notifying the sender of the correction made by the receiving device by displaying a second indicator, wherein the sending device is configured to allow the sender to override or confirm the correction made by the receiving device; and storing the correction made by the receiving device for each individual sender.

* * * * *